Feb. 17, 1970 J. J. WEINSTOCK ET AL 3,496,359
PORTABLE BETA BACKSCATTER TYPE MEASURING INSTRUMENT
Filed Feb. 9, 1966 2 Sheets-Sheet 1
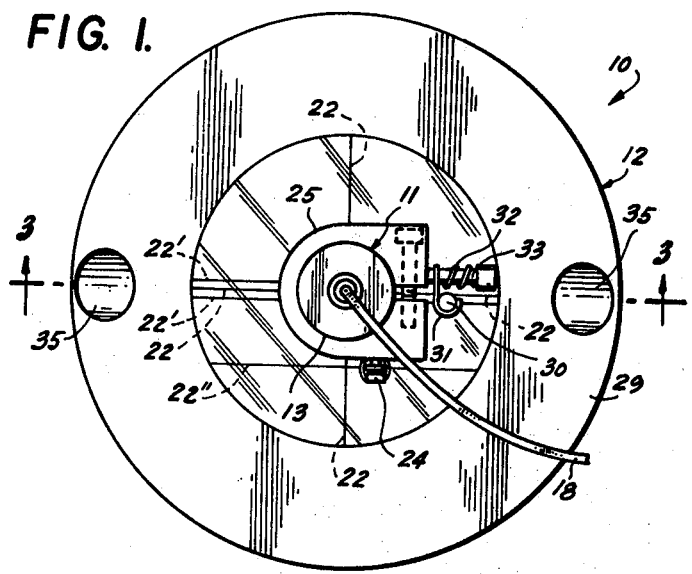
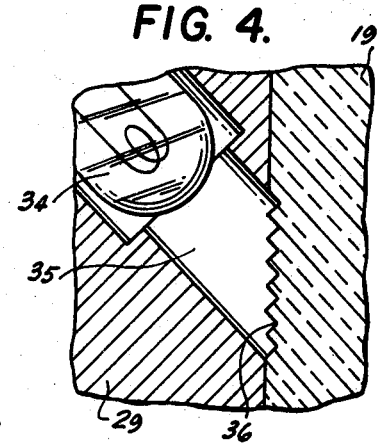
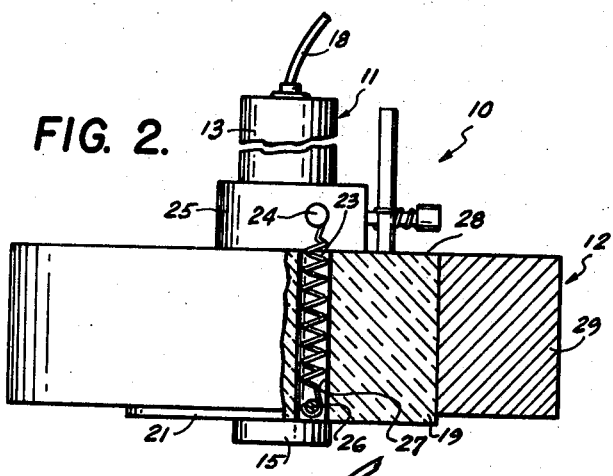
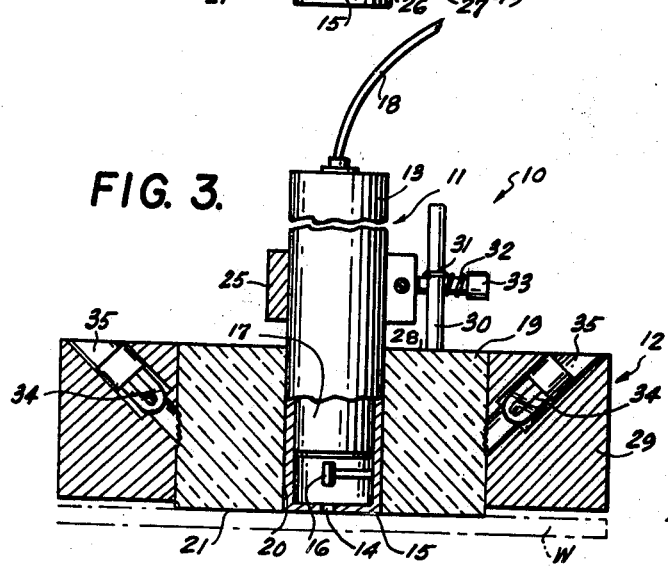
INVENTORS
JACQUES J. WEINSTOCK
DONALD E. WADE
SIDNEY U. LIEBER
WILLIAM D. HAY
BY
ATTORNEY Feb. 17, 1970  J. J. WEINSTOCK ET AL  3,496,359
PORTABLE BETA BACKSCATTER TYPE MEASURING INSTRUMENT
Filed Feb. 9, 1966  2 Sheets-Sheet 2

INVENTORS
JACQUES J. WEINSTOCK
DONALD E. WADE
SIDNEY U. LIEBER
WILLIAM D. HAY
BY
Robert E. Isner
ATTORNEY United States Patent Office 3,496,359
Patented Feb. 17, 1970

3,496,359
PORTABLE BETA BACKSCATTER TYPE
MEASURING INSTRUMENT
Jacques J. Weinstock, Flushing, Donald E. Wade, Jackson Heights, Sidney U. Lieber, Bayside, and William D. Hay, Peekskill, N.Y., assignors to Unit Process Assemblies, Inc., Woodside, N.Y., a corporation of New York
Filed Feb. 9, 1966, Ser. No. 526,231
Int. Cl. G01t 1/16; H01j 39/00
U.S. Cl. 250—83.3                 11 Claims

ABSTRACT OF THE DISCLOSURE

Portable beta backscatter type measuring instrument having a pencil probe assembly displaceably mounted within the bore of a weighted transparent guide member having positioning indicia on the lower surface thereof to permit blind positioning of the probe assembly in desired positional relationship with the specific portions of a workpiece to be subject to measurement.

---

This invention relates generally to instruments employing beta-radiation backscatter techniques for measuring the thicknesses of thin layers or coatings of one substance on a base material or substrate having a significantly different atomic number.

In instruments of the described type, radiation from a suitable beta-emitting isotope is directed against a surface of the workpiece or sample to be measured, and a detector, for example, a Geiger tube, picks up the backscatter, that is, the beta-radiation backscattered from the workpiece, and transmits corresponding signals to a suitable electronic system for interpretation and translation into readings on a meter. The intensity of the backscatter of the beta rays is proportional to the atomic number of the material at the surface of the workpiece against which the radiation is directed and, where the workpiece has a coating substance of an atomic number different than that of the base material or substrate, the intensity of the backscattered radiation is further proportional to the thickness of the coating.

Comparisons of the values obtained by the above procedure with the values from known thickness standards lead to quantitative measured results. Thus, through such comparative measurement techniques, the meter readings can be calibrated to indicate the thicknesses of various coating substances on various base materials. Beta-ray backscatter measuring instruments have particularly found application in the measurement of the thicknesses of thin precious metal deposits and other coatings on small or restricted areas of electronic components such as, for example, printed circuit boards and the like.

Where the coating to be measured extends over only small or restricted areas of the base material, accuracy of the thickness measurement requires that only the coated area to be exposed to radiation, as backscatter of radiation from adjacent uncoated surfaces of the base material will result in a meter reading that is not accurately related to the coating thickness. In view of the foregoing, it has been proposed, for example, in U.S. Patent No. 3,115,577, issued Dec. 24, 1963, to B. B. Joffe et al., to provide a radiation backscatter measururing instrument which includes, as a component thereof, a measuring table assembly that serves to support the workpiece and is provided with an aperture or exposure opening through which a defined area of the workpiece is exposed to the beta-radiation. However, in such type of instruments, the radiation source and detector are mounted below the work-table surface, and the workpiece is placed on, and supported by the support table for exposure to radiation at the defined area of its downwardly facing surface disposed in register with the aperture or exposure opening therein. The foregoing arrangement is disadvantageous in that the necessarily limited size of the support table effectively limits the size of workpiece that can be handled and, moreover, it requires transport of the workpiece to the radiation backscatter measuring instrument and thus does not permit measurement of the coating thickness on the workpiece at its assembled location. A further disadvantage is that effecting registration of the aperture or exposure opening with a predetermined desired area of the downwardly facing, and hence hidden, surface of the workpiece at which the thickness measurement is to be effected requires the use of auxiliary mirrors or other reflecting elements and associated illuminating means.

In order to permit the measurement of coating thicknesses on a workpiece at its assembled location, radiation backscatter measuring instruments have also incorporated a radially portable probe assembly that includes a hand-held casing containing a radiation source and a detector for the backscattered radiation from a workpiece exposed to radiation from the source through one end of the casing held against the work piece. In the case of such portable probe assemblies, accuracy and reproducibility of the thickness measurement requires that the casing be held squarely against the workpiece so as to maintain a standardized alignment and distance between the surface exposed to radiation and the detector within the casing. However, when the casing is engageable with the workpiece over a relatively large area of the surface thereof so as to suitably stabilize the hand held casing normal to the surface of the workpiece, then it becomes difficult, if not impossible, to ensure the desired alignment of a restricted or limited area of the workpiece surface with the radiation source. Thus, for example, if an end of the probe casing to be held against a circuit board covers a relatively large area of the latter so as to ensure that the casing will be held normal to the circuit board, there is no way to determine whether the area at which the thickness of a deposit or coating is to be measured is accurately aligned or registered with the radiation source within the relatively large area covered by the probe casing.

Accordingly, it is an object of this invention to provide an improved probe assembly for a portable radiation backscatter measuring instrument that includes a guide which serves to hold the probe casing normal to the surface of a workpiece and which permits the accurate location of the exposure opening or aperture of the probe casing with respect to a limited or restricted area of the workpiece at which thickness measurement is to be effected.

In accordance with an aspect of this invention, a probe assembly including an elongated casing having an aperture or exposure opening at one end and containing a radiation source and a detector for the backscattered radiation from a workpiece exposed to radiation from the source through the aperture of the casing, is provided with a guide that includes a transparent body extending around the casing and having the apertured end of the latter exposed at a face of the body to contact a workpiece against which the body abuts over a relatively wide area, and guide lines on the face of the transparent body which are visible through the latter to assist in locating the aperture or exposure opening relative to a correspondingly restricted area of the workpiece within the wide area of the latter against which the guide body abuts.

In a preferred embodiment of this invention, the transparent body of the guide has a bore in which the probe casing is slidable, and the probe casing is yieldably urged relative to the guide body so as to project the radiation emitting end of the casing beyond the face of the guide body and thereby ensure uniform contact of the apertured end of the casing with a workpiece against which the face of the guide body is pressed.

In accordance with another feature of this invention, the guide for the probe assembly further includes a relatively massive member fixed around the transparent body and being of sufficient weight to gravitationally urge the body against a workpiece in opposition to the spring or other means yieldably urging the probe casing relative to the body.

A further object of the invention is to provide a guide of the described character with means by which light is directed through its transparent body for illuminating the guide lines thereon and the surface of a workpiece against which the transparent body abuts, thereby to further facilitate locating of the aperture or exposure opening with respect to the workpiece.

The above, and other objects, features and advantages of this invention, will be apparent in the following detailed description of an illustrative embodiment thereof which is to be read in connection with the accompanying drawing, wherein:

FIG. 1 is a top plan view of the probe assembly and guide of a portable radiation backscatter measuring instrument in accordance with an embodiment of this invention;

FIG. 2 is a side elevational view of the probe assembly and guide shown partly broken away and in section;

FIG. 3 is a sectional view taken along the line 3—3 on FIG. 1;

FIG. 4 is an enlarged, fragmentary sectional view illustrating a detail of the guide embodying this invention;

Figure 6:
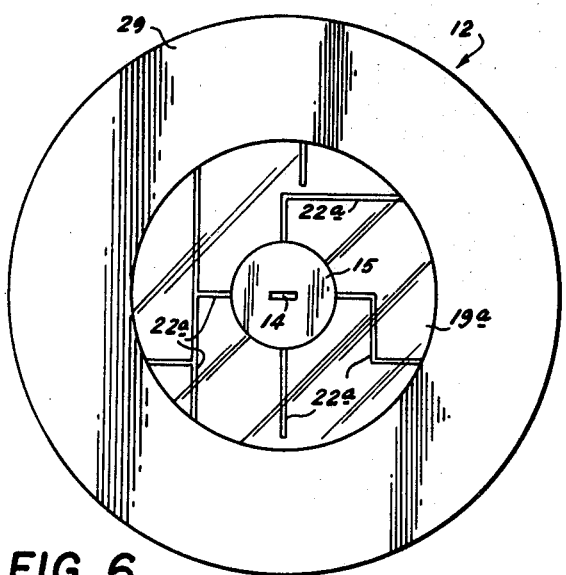
FIG. 6 is a bottom plan view of the probe assembly and guide embodying this invention, but with a modified pattern of guide lines shown on the guide to specifically adapt the same for the measurement of the thickness of a coating or deposit at a predetermined location on the circuit board of FIG. 5.

Referring to the drawing in detail, and initially to FIGS. 1, 2 and 3 thereof, it will be seen that a portable radiation backscatter measuring instrument 10 embodying this invention generally comprises a probe assembly 11 and a guide 12.

The probe assembly 11 includes an elongated casing 13 which may be cylindrical, as shown, and which has a restricted aperture or exposure opening 14 in one end 15 of the casing (FIGS. 3 and 6). A beta-ray emitting isotope or other source is contained in a source holder assembly 16 (FIG. 3) which is supported within casing 13 adjacent end 15 thereof so that radiation from such source will be directed toward the surface of a workpiece W against which end 15 abuts at the area of such surface exposed at aperture 14. Casing 13 further contains a detector 17, for example, a Geiger tube of the pencil type which is shielded from direct radiation by the source holder assembly 16. Detector 17 picks up the beta-radiation backscattered from the work piece through aperture 14 and transmits corresponding signals, for example, through a cable 18 extending from casing 13, to a suitable electronic system (not shown) at which such signals are interpreted and translated into readings on a calibarted meter.

In accordance with this invention, the guide 12 for probe assembly 11 includes a body 19 of transparent material, for example, of methyl methacrylate, having a bore 20 that slidably receives casing 13 and opens at a face 21 of body 19 for exposing end 15 of the casing within face 21.

It will be apparent that face 21 of body 19 is adapted to abut against a printed circuit board or other workpiece W having a planar surface over a substantial area thereof so that probe assembly 11 will be held with its axis normal to the planar surface of the workpiece, thereby to maintain a standard alignment and distance between the surface of the workpiece exposed to radiation at aperture 14 and the detector 17.

In accordance with this invention, face 21 of transparent body 19 is provided with guide lines 22 visible from above through the transparent body extending around casing 13. As shown on FIG. 1, guide lines 22 may extend at right angles to each other across face 21 to form a reticle having aperture 14 at its intersection.

Figure 5:
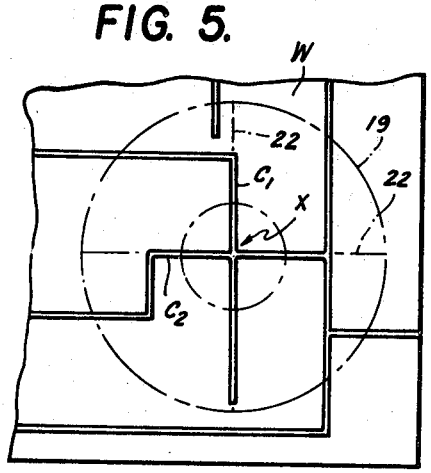
FIG. 5 is a plan view of a portion of a circuit board which illustrates one application or use of instruments embodying this invention.

When the workpiece W is a printed circuit board, as shown on FIG. 5, and the thickness measurement is to be effected over a small or limited area at a specific location on the pattern of conductive lines coated or applied to the base material of the circuit board, for example, at the intersection X of the lines $C_1$ and $C_2$, the transparent body 19 is placed against the surface of the circuit board and manipulated laterally until the guide lines 22 defining a reticle or cross hairs, and indicated in broken lines on FIG. 5, are aligned with the coating lines $C_1$ and $C_2$. When such alignment is achieved, it is certain that aperture or exposure opening 14 of casing 13 registers with the exact location X at which the thickness measurement is to be made, even though both the aperture 14 and the intersection or location X are hidden from view by casing 13.

If desired, as shown on FIG. 1, additional guide lines 22′ may be provided on face 21 parallel to, and at opposite sides of one of the lines 22, and also sufficiently spaced from line 22 to clear bore 20, as at 22″. The additional guide lines 22′ and 22″ ensure that, when closely spaced parallel coating lines are provided on the workpiece, the guide line 22 between guide lines 22′ will not be canted or slightly angled with respect to the coating lines and thus registered with different coating lines at the diametrically opposed sides of bore 20 and casing 13.

Alternatively, as shown on FIG. 6, the guide lines 22a on the underside of transparent body 19a may form a reproduction or overlay of the pattern of the conductive lines or coatings on the circuit board or other workpiece in the region around the location X at which a thickness measurement is to be effected. When the transparent body 19a has its guide lines 22a arranged in a pattern, as on FIG. 6, the guide lines, as seen through the transparent body, are merely superposed on the corresponding lines of the circuit board to once again ensure that aperture 14 of the probe casing registers with the exact location X at which a measurement is to be made. The arrangement of the guide lines 22a in a pattern corresponding to that of the workpiece is particularly useful when repetitive thickness measurements are to be made at a single location on each of a large number of circuit boards during the mass production thereof.

In order to ensure that end 15 of casing 13 will be held in secure contact with the surface of a workpiece against which face 21 of body 19 abuts, casing 13 is urged axially relative to body 19 in the direction to project end 15 of the casing beyond face 21, for example, as shown on FIG. 2. The force for thus urging casing 13 relative to body 19 may be exerted by a spring 23 connected at one end to an anchor 24 extending from a clamp 25 which is secured on casing 13 above body 19 and is adjustable along the casing. The other or lower end of spring 23 may be connected to a pin 26 (FIG. 2) which extends across the lower end portion of a bore 27 formed in body 19 to receive spring 23. It will be apparent that engagement of clamp 25 with the upper surface 28 of body 19 limits the projection of end 15 of casing 13 beyond face 21 of the transparent body, so that the extent of such projection can be varied by adjusting clamp 25 along casing 13.

When transparent body 19 is urged toward the surface of a workpiece by a force greater than that exerted by spring 23, casing 13 is moved relative to body 19 so as to more or less retract the casing into bore 20 and thereby achieve simultaneous contact of end 15 of the casing and face 21 of the transparent body with the workpiece. The spring 23 ensures that the contact pressure of end 15 of the casing against the surface of a workpiece will be uniform for successive thickness measurements, even when the portion of the workpiece surface contacted by end 15 of the probe casing is recessed with respect to the surface portions against which face 21 is made to bear.

In the illustrated embodiment of the invention, the force for urging face 21 of the transparent body against the workpiece surface in opposition to the force of spring 23 is provided by a relatively massive member 29 of a dense material, for example, of stainless steel or other metals, which encircles transparent body 19 and is suitably fixed thereto. The weight of member 29 is suitably large so that the force of gravity resulting therefrom will be sufficient to overcome the force of spring 23. Thus, when probe assembly 11 having the guide 12 thereon is placed upon a circuit board or other workpiece W which is arranged horizontally, as shown on FIG. 3, the weight of member 29 will automatically effect downward movement of transparent body 19 relative to casing 13 for bringing face 21 of the transparent body into bearing engagement with the upper surface of the workpiece over a relatively large area thereof, while the lower end 15 of the probe casing is held in contact with the surface of the workpiece by spring 23.

When aperture or exposure opening 14 at end 15 of the probe casing is noncircular, for example, when the aperture is in the form of an elongated slot, as shown on FIG. 6, guide 12 is further preferably provided with means for holding casing 13 against rotation relative to transparent body 19, thereby to maintain a predetermined orientation of guide lines 22 or 22a with respect to the slot or other noncircular opening constituting aperture 14. Rotation of casing 13 in bore 20 of body 19 may be prevented by providing casing 13 and bore 20 with mating noncircular cross sections or, as shown on FIGS. 1 and 3, by providing a guide rod 30 projecting upwardly from the upper surface of body 19 parallel to the axis of casing 13 and engaged by a hooked end 31 on a torsion spring 32 carried by a headed pin 33 which extends from clamp 25. The hooked end 31 of the torsion spring is slidable along guide rod 30 so as to permit axial displacement of casing 13 relative to transparent body 19, as described above.

The guide 12 embodying this invention is further preferably provided with illuminating means directing light through transparent body 19 for illuminating guide lines 22 or 22a at the face 21 thereof, and also for illuminating the surface of the workpiece against which face 21 bears, thereby to facilitate the registration of the guide lines with the coating lines on the workpiece. In the illustrated embodiment, such illuminating means includes light sources 34 (FIG. 3) housed in cavities 35 which are formed in member 29 at spaced apart locations around transparent body 19 and which open at the side surface of the transparent body. Since cavities 35 are inclined downwardly in the direction toward body 19 so as to direct the light from sources 35 toward the bottom face 21 of body 19, the light rays from each source 34 impinge against body 19 at an angle to the side surface thereof. In order to avoid reflection of such impinging light rays at the side surface of body 19 and to promote the entry of the light rays into the transparent body for transmission therethrough to face 21 thereof, the side surface of transparent body 19, at least in the region of each cavity 35, is formed with serrations or saw-tooth grooves 36 (FIG. 4) so as to provide facets that are normal or substantially at right angles to the directions of the light rays impinging thereagainst.

When the area of the workpiece at which measurements are to be made is so small as to be obscured from view by casing 13, so that coating lines or the like in such small area cannot be aligned with guide lines 22 on face 21 of transparent body 19, a locating accessory 37 (FIGS. 7 and 8) may be used in conjunction with probe assembly 11 and guide 12. Such locating accessory, as shown, may consist of a thin, flexible sheet 38 of transparent plastic material, such as, Mylar, vinyl and the like, having right angularly related, intersecting guide lines 122. Sheet 38 is cut along two parallel, spaced lines 39 and a transverse line 40 extending between lines 39 at one end of the latter to provide a flap 41 which is connected to the remainder of the sheet at a fold or hinge line 42. The cut lines 39 and 40 are located so that the intersection of guide lines 122 will appear approximately at the center of flap 41. Sheet 38 further preferably has bands or zones of tacky adhesive applied to the underside thereof at least along opposed edges of the sheet, as indicated at 43.

Figure 7:
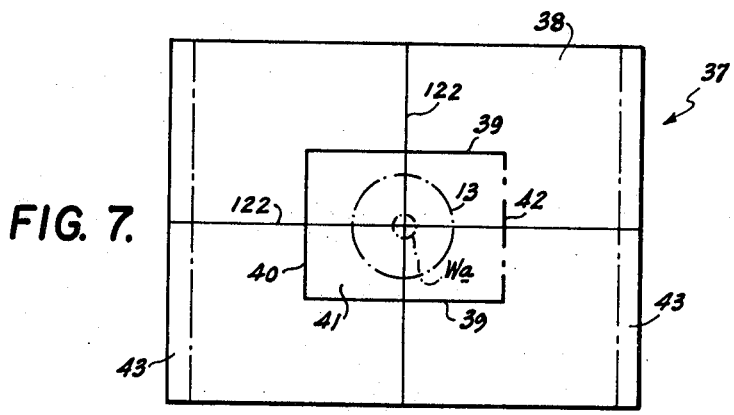
FIG. 7 is a plan view of a locating accessory for use with the probe assembly and guide in accordance with this invention.
Figure 8:
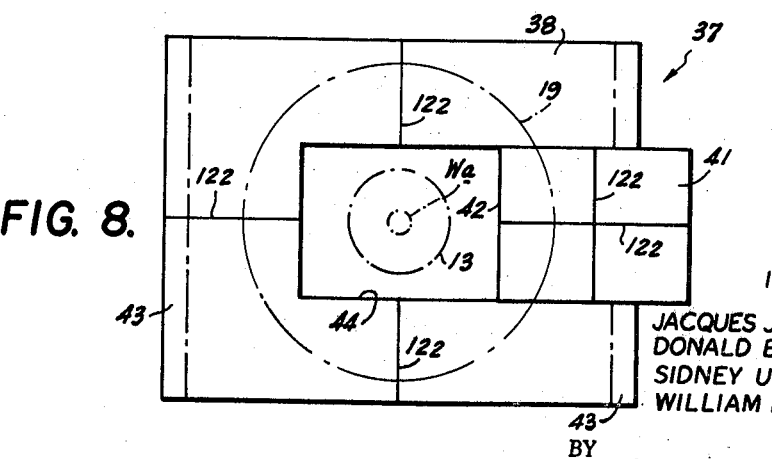
FIG. 8 is a view similar to that of FIG. 7, but showing a flap of the locating accessory in its open position so as to avoid interference with thickness measurements.

In using the locating accessory 37, the sheet 38 is initially laid over the workpiece with its flap 41 in closed position, as shown on FIG. 7, and the intersection of guide lines 122 is registered with the location within the small work area, indicated at Wa, at which measurements are to be made. After such registration, tacky zones 43 are pressed against the workpiece to adhere thereto and avoid inadvertent shifting of sheet 38 relative to the workpiece. Then, flap 41 is floded-back about line 42, as shown on FIG. 8, to provide an opening 44 in sheet 38 having work area Wa at its center, and probe assembly 11 and guide 12 are applied over sheet 38 and located so as to have the guide lines 22 of body 19 registered with the visible portions of guide lines 122 extending from the periphery of opening 44. Such location of the probe assembly and guide relative to sheet 38 ensures proper alignment of the radiation source with the work area Wa even though the latter is obscured from view by casing 13. Since measuremnts are made with casing 13 pressed against the workpiece through opening 44, sheet 38 does not interfere with the accuracy of the measurements.

It will be apparent that the combination of the probe assembly 11 and guide 12, as described above, can be applied to a printed circuit board or other similar workpiece in situ, that is, at its place of assembly, to effect thickness measurements by the beta-radiation backscatter technique at a limited area of the workpiece surface with which the exposure opening or aperture 14 of the probe assembly is accurately registered. Thus, thickness measurements can be accurately effected in a convenient manner.

Although illustrative embodiments of this invention have been described in detail herein with reference to the accompanying drawing, it is to be understood that the invention is not limited to those precise embodiments, and that various changes and modifications may be effected therein by one skilled in the art without departing from the scope or spirit of the invention, except as defined in the appended claims.

What is claimed is:

1. In a portable radiation backscatter measuring instrument adapted to be manually displaced into operative engagement with a workpiece, the combination of a probe assembly including an elongated casing having an opening at one end and containing a radiation source positioned in predetermined relationship therewith and means for detecting radiation backscattered from a workpiece exposed to radiation from said source through said opening in the casing, and a guide for said probe assembly including a transparent body having a bore extending therethrough sized to slidably receive said casing with said one end thereof exposed at a face of said body to contact a workpiece against which said body is adapted to be placed in abutting relation over a relatively wide area, biasing means yieldably urging said casing relative to said body so as to project said one end of the casing beyond said face and thereby ensure relatively uniform contact of said end of the casing with a workpiece against which said face of the body is disposed and guide lines on said face of the transparent body being visible through the latter to assist in manually locating said radiation source relative to a correspondingly restricted area of the workpiece within said wide area of the latter.

2. A portable radiation backscatter measuring instrument according to claim 1; wherein said guide further includes a relatively massive member fixed around said transparent body and being of sufficient weight to gravitationally urge said body against a work piece in opposition to said means yieldably urging the casing relative to the body.

3. A portable radiation backscatter measuring instrument according to claim 1; wherein said opening of the casing is in the form of a diminutive elongated slot, and said casing and bore of the body have circular cross sections; and wherein said guide further includes means holding said casing against rotation in said bore, thereby to maintain a predetermined orientation of said slot relative to said guide lines.

4. A portable radiation backscatter measuring instrument according to claim 1; wherein said guide further includes illuminating means directing light through said transparent body for illuminating said guide lines and the surface of a work piece against which said body abuts.

5. A portable radiation backscatter measuring instrument according to claim 1; wherein said guide lines are in the form of reticle having said aperture at the intersection thereof.

6. A portable radiation backscatter measuring instrument according to claim 1; wherein said guide lines form a pattern corresponding to a pattern on the workpiece so that said radiation source is disposed at a predetermined location relative to the portion of the workpiece being subjected to measurement when said pattern of the guide lines is superposed on the pattern of the workpiece.

7. A portable radiation backscatter measuring instrument according to claim 1; further comprising a transparent locating sheet adapted to overlie said relatively wide area of the workpiece, said locating sheet having an opening therein and a movable portion selectively disposable in a closed position in said opening of the sheet and in an opened position to uncover said opening in the sheet, said locating sheet further having guide lines extending thereacross and continuing in said movable portion in said closed position thereof, whereby, with said movable portion of the sheet in its closed position, said guide lines of the sheet can be aligned with an area of the workpiece which is smaller than the cross section of said casing and, thereafter, with said movable portion of the sheet in said opened position, said guide lines of the transparent guide body can be aligned with said guide lines of the sheet beyond said opening of the latter to assist in locating the radiation source relative to said workpiece area smaller than the casing cross section and hence obscured by said casing.

8. A portable radiation backscatter measuring instrument according to claim 7; wherein said locating sheet is of flexible material and said movable portion of the sheet is in the form of a flap foldable relative to the remainder of said locating sheet.

9. A portable radiation backscatter measuring instrument according to claim 7; wherein said locating sheet has a tacky substance on zones of the surface thereof to contact the workpiece and thereby prevent shifting of the locating sheet relative to the workpiece following alignment of said guide lines of the sheet with an area of the workpiece.

10. A portable radiation backscatter measuring instrument according to claim 1; including a relatively massive opaque member fixed around said transparent body and being of sufficient weight to gravitationally urge said body against a workpiece in opposition to said biasing means, said opaque member having cavities therein opening at said transparent body, and light sources in said cavities operative to direct light through said transparent body for illuminating said guide lines and the surface of a workpiece against which said body abuts.

11. A portable radiation backscatter measuring instrument according to claim 10; wherein said transparent body has serrations in the surface portions thereof at which said cavities open, thereby to promote the entry of light into said body from said light sources.

References Cited

UNITED STATES PATENTS

| | | | |
|---|---|---|---|
| 2,289,272 | 7/1942 | Kibbe | 350—243 |
| 2,426,480 | 8/1947 | Wood | 350—244 |
| 3,001,073 | 9/1961 | Alexander et al. | |
| 3,132,248 | 5/1964 | Eggebraaten et al. | |
| 3,308,711 | 3/1967 | Dyer. | |
| 3,319,065 | 5/1967 | Webster et al. | 250—83.3 |

RALPH G. NILSON, Primary Examiner

SAUL ELBAUM, Assistant Examiner

U.S. Cl. X.R.

88—14; 350—244